(12) United States Patent
Yamaguchi et al.

(10) Patent No.: US 11,279,083 B2
(45) Date of Patent: Mar. 22, 2022

(54) POWDER LAYERED MODELING APPARATUS

(71) Applicant: HITACHI, LTD., Tokyo (JP)

(72) Inventors: Akihiro Yamaguchi, Tokyo (JP); Satoshi Arai, Tokyo (JP); Shigeharu Tsunoda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 226 days.

(21) Appl. No.: 16/133,052

(22) Filed: Sep. 17, 2018

(65) Prior Publication Data

US 2019/0275736 A1    Sep. 12, 2019

(30) Foreign Application Priority Data

Mar. 7, 2018   (JP) .............................. JP2018-040862

(51) Int. Cl.
    *B29C 64/153*     (2017.01)
    *B29C 64/393*     (2017.01)
    (Continued)

(52) U.S. Cl.
    CPC .......... *B29C 64/153* (2017.08); *B29C 64/268* (2017.08); *B29C 64/393* (2017.08);
    (Continued)

(58) Field of Classification Search
    CPC ... B29C 64/153; B29C 64/393; B29C 64/268; B33Y 10/00; B33Y 30/00; B33Y 50/02
    See application file for complete search history.

(56) References Cited

U.S. PATENT DOCUMENTS

| | | | |
|---|---|---|---|
| 2012/0156516 A1 | 6/2012 | Matsui et al. | |
| 2015/0290671 A1* | 10/2015 | Jakimov | B22F 12/00 427/180 |

(Continued)

FOREIGN PATENT DOCUMENTS

| | | |
|---|---|---|
| JP | 2012-131094 A | 7/2012 |
| JP | 2017-149004 A | 8/2017 |

OTHER PUBLICATIONS

Extended European Search Report dated Apr. 25, 2019 for the European Patent Application No. 18192017.4.

(Continued)

*Primary Examiner* — Jacob T Minskey
*Assistant Examiner* — Caroline Beha
(74) *Attorney, Agent, or Firm* — Volpe Koenig

(57) ABSTRACT

A powder layered modeling apparatus capable of modeling a three-dimensional object using a material powder contains at least a crystalline resin and filler particles. A modeling unit which partitions a modeling space for laying a material powder layer by the material powder to mold the three-dimensional object, a powder laying unit capable of laying the material powder layer in the modeling space by moving the material powder along a first direction with respect to the modeling space, a powder laying unit capable of laying the material powder layer in the modeling space by moving the material powder along a second direction not parallel to the first direction, and an energy supply unit which supplies energy for melting or sintering the material powder to a part constituting a cross-sectional layer to be molded of the three-dimensional object of the material powder layer laid in the modeling space.

10 Claims, 10 Drawing Sheets

(51) Int. Cl.
*B33Y 10/00* (2015.01)
*B33Y 30/00* (2015.01)
*B33Y 50/02* (2015.01)
*B33Y 70/00* (2020.01)
*B29C 64/268* (2017.01)

(52) U.S. Cl.
CPC ....... *B29K 2995/0044* (2013.01); *B33Y 10/00* (2014.12); *B33Y 30/00* (2014.12); *B33Y 50/02* (2014.12); *B33Y 70/00* (2014.12)

(56) References Cited

U.S. PATENT DOCUMENTS

| | | | |
|---|---|---|---|
| 2016/0236278 A1* | 8/2016 | Ishimoto | B29C 64/393 |
| 2016/0354840 A1* | 12/2016 | Kulinsky | B29C 64/153 |
| 2017/0189960 A1* | 7/2017 | Ibe | B22F 1/0096 |
| 2017/0190905 A1 | 7/2017 | Arai et al. | |
| 2019/0047220 A1 | 2/2019 | Ojima | |

OTHER PUBLICATIONS

Japanese Office Action dated Mar. 30, 2021 for Japanese Patent Application No. 2018-040862.

\* cited by examiner

POWDER LAYERED MODELING APPARATUS

TECHNICAL FIELD

The present invention relates to a powder layered modeling apparatus.

BACKGROUND ART

As a background art in this technical field, there is disclosed in PTL 1. PTL 1 discloses "a three-dimensional modeling apparatus including a stage on which a powder material layered is deposited, a supply mechanism which supplies the powder material for each layer onto the stage, a plurality of heads which respectively have a plurality of nozzles for ejecting a liquid for forming a molded article and are capable of ejecting the liquid to the powder material supplied onto the stage by the supply mechanism, and a moving mechanism which respectively moves the plurality of heads in different directions relative to the stage".

In addition, in recent years, there has been known a powder layered modeling apparatus for modeling by melting or sintering a material powder by supplying energy to the material powder by laser or the like, instead of jetting a liquid for modeling.

CITATION LIST

Patent Literature

PTL 1: JP-A-2012-131094

SUMMARY OF INVENTION

Technical Problem

For example, it is required for a molded article molded by an apparatus to prevent breakage of the molded article, to give the anisotropy desired by a user about shrinkage and tensile strength, or to impart isotropy.

According to the technique disclosed in PTL 1, it is possible to prevent formation of a region in which a molded article is easily cracked, and to prevent damage to a molded article in a direction in which the molded article is easily cracked.

However, the technique disclosed in PTL 1 is a technique for preventing damage of a molded article when an ejection defect occurs in at least one nozzle in one head, and is an invention on the premise of an apparatus having a head which jets a liquid. However, this technique cannot be applied to a powder layered modeling apparatus for layering powder with supplying energy.

In addition, a filler having a longitudinal direction may be included as a material powder, but when such a material powder is used, the influence of the filler has to be considered and it is difficult to adjust the anisotropy of shrinkage and tensile strength of a molded article.

Solution to Problem

In order to solve the above problems, according to one aspect of the present invention, there is provided a powder layered modeling method by a powder layered modeling apparatus capable of modeling a three-dimensional object using a material powder containing at least a crystalline resin and filler particles, in which the filler particles has a shape having a longitudinal direction, for each cross-sectional layer of the three-dimensional object: a material powder layer laying step of performing, at least once, at least one of a first laying step of, by moving the material powder on a plane including a surface which becomes an upper surface of a material powder layer along a first direction with respect to a modeling space of a modeling unit of the powder layered modeling apparatus for laying the material powder layer by the material powder, laying the material powder layer in the modeling space so that a rate at which the longitudinal direction of the filler particles is directed to the first direction is increased, and a second laying step of, by moving the material powder on the plane along a second direction not parallel to the first direction with respect to the modeling space, laying the material powder layer in the modeling space so that a rate at which the longitudinal direction of the filler particles is directed to the second direction is increased; and an energy supply step of supplying energy for melting or sintering the material powder to a part constituting the cross-sectional layer of the three-dimensional object of the material powder layer laid in the material powder layer laying step are performed, and in the material powder layer laying step, a step to be performed out of the first laying step and the second laying step is determined according to a predetermined condition.

In order to solve the above problems, according to another aspect of the present invention, there is provided a powder layered modeling apparatus capable of modeling a three-dimensional object using a material powder containing at least a crystalline resin and filler particles, in which the filler particles has a shape having a longitudinal direction, the powder layered modeling apparatus includes a modeling unit which partitions a modeling space for laying a material powder layer by the material powder to mold the three-dimensional object, a first powder supply unit which is capable of accumulating the material powder and moving the material powder to an upper part, a first powder laying unit which is capable of laying the material powder layer in the modeling space by moving the material powder moved to the upper part of the first powder supply unit on a plane including a surface which becomes an upper surface of the material powder layer along a first direction with respect to the modeling space, a second powder supply unit which accumulates the material powder and moves the material powder to an upper part, a second powder laying unit which is capable of laying the material powder layer in the modeling space by moving the material powder on the plane along a second direction not parallel to the first direction with respect to the modeling space, and an energy supply unit which supplies energy for melting or sintering the material powder to apart constituting a cross-sectional layer to be molded of the three-dimensional object of the material powder layer laid in the modeling space.

Advantageous Effects of Invention

According to the present invention, it is possible to appropriately adjust the anisotropy of shrinkage and tensile strength of a molded article.

DESCRIPTION OF EMBODIMENTS

<<System Configuration of Embodiment>>

Figure 8:
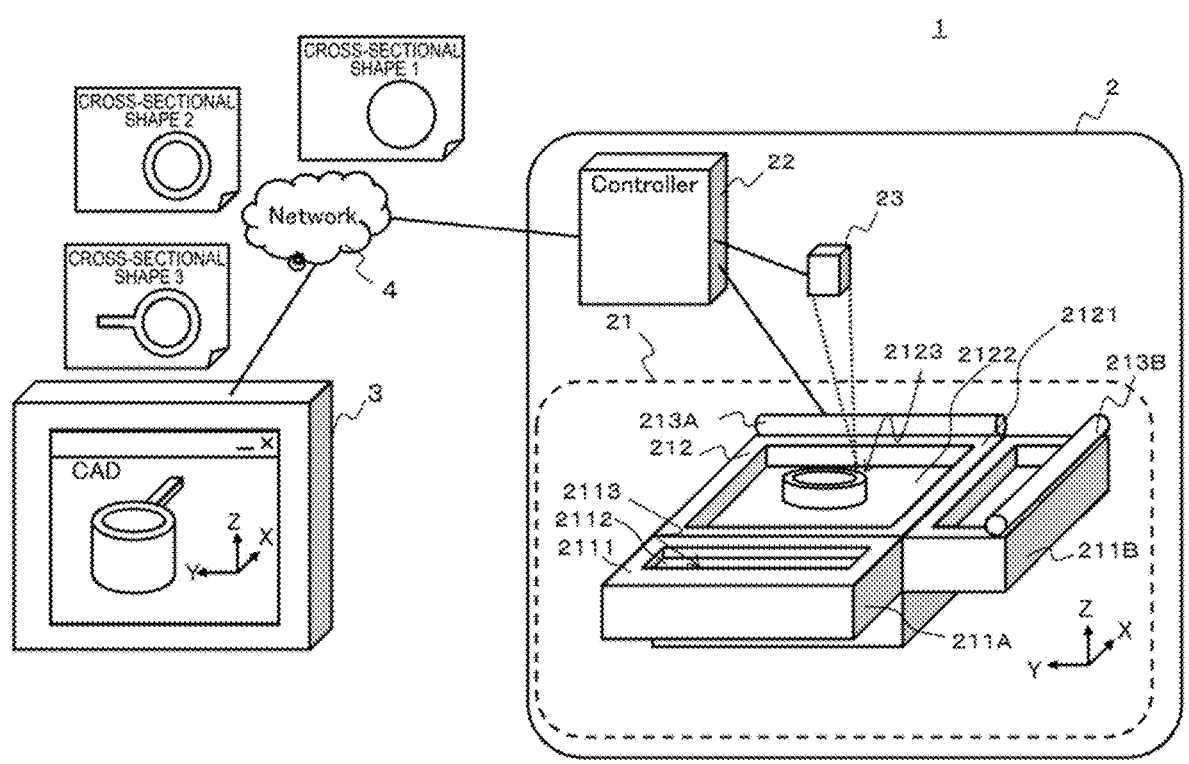
FIG. 8 is a configuration diagram showing a modeling system according to one embodiment.

FIG. 8 is a configuration diagram showing a modeling system according to one embodiment.

A modeling system 1 includes a powder layered modeling apparatus 2 (hereinafter, also simply referred to as a modeling apparatus), a designing computer 3, and a network 4 connecting the powder layered modeling apparatus 2 and the designing computer 3.

The network 4 may be wired network or wireless network. Instead of the network 4, a nonvolatile memory medium (for example, flash memory or HDD) may be used as means for transmitting information from the designing computer 3 to the powder layered modeling apparatus 2. In addition, the controller 22 of the powder layered modeling apparatus 2 described later may also function as the designing computer 3.

<<1.1. Powder Layered Modeling Apparatus>>

The modeling apparatus 2 includes a modeling mechanism unit 21, a controller 22, and an energy supply unit 23. The modeling mechanism unit 21 includes a plurality of powder supply units 211 (211A and 211B), a modeling unit 212, and a plurality of powder laying units 213 (213A and 213B). During modeling of a three-dimensional object, a material powder is accumulated in the modeling unit 212 or the powder supply unit 211 of the modeling apparatus 2, but the powder accumulation is not shown in FIG. 8. Each constituent component of the modeling apparatus 2 will be described below.

Modeling mechanism unit 21: The modeling mechanism unit 21 includes the plurality of powder supply units 211 (211A and 211B), the modeling unit 212, and the plurality of powder laying units 213 (213A and 213B) as described above. In FIG. 8, the modeling mechanism unit 21 is in the form of an example of a mechanism form to be described later, but it goes without saying that the configuration of the modeling mechanism unit 21 may adopt another mechanism form.

Controller 22: The controller 22 is a computer which is connected to the modeling mechanism unit 21 and the energy supply unit 23 and controls these components.

Energy supply unit 23: The energy supply unit 23 is a device for melting and sintering the material powder by supplying energy to the material powder at the position which becomes the constituent part of the three-dimensional object. Examples of the energy supply unit 23 include a laser light source that supplies energy by irradiation with a laser beam, a beam source that supplies energy by a beam, and a heater that supplies energy by irradiation with heat rays.

Powder supply unit 211 (211A and 211B): The powder supply unit 211 is a component that supplies the material powder to be laid on the modeling unit 212. As shown in FIG. 8, for example, the powder supply unit 211 include a side wall 2111 (also referred to as a supply unit side wall), and a movable bed 2112 (also referred to as a supply unit movable bed. In the powder supply unit 211, an accumulation space 2113 of the material powder in which at least a part of the upper part is opened is partitioned by the supply unit side wall 2111 and the supply unit movable bed 2112. In the powder supply unit 211, the material powder accumulated in the accumulation space 2113 is moved upward by moving the supply unit movable bed 2112 upward. In order to allow the powder laying unit 213 described later to move the material powder without waste, an upper end of the supply unit side wall 2111 (particularly, a part along the accumulation space 2113) is preferably formed such that the whole wall surrounding the accumulation space 2113 have the same height. However, the upper end may be partially high or low. The powder supply unit 211 typically includes an actuator (for example, a motor and a piston) (not shown) for vertically moving the supply unit movable bed 2112.

Modeling unit 212: The modeling unit 212 has a side wall 2121 (also referred to as a modeling unit side wall) and a movable bed 2122 (also referred to as modeling unit movable bed). In the modeling unit 212, a space 2123 in which at least a part of the upper part is opened (hereinafter, referred to as a modeling space) is partitioned by the modeling unit side wall 2121 and the modeling unit movable bed 2122. In the modeling space 2123, the material powder supplied from the powder supply unit 211 is laid in layers to mold a three-dimensional object by the energy supplied by the energy supply unit 23. FIG. 8 shows that, as an example thereof, a part of the cylinder part of a ladle displayed on the designing computer 3 is undergoing modeling.

Powder laying unit 213: The powder laying unit 213 is a component that lays the material powder supplied to the upper part of the powder supply unit 211 to be layered from the opening the upper part of the modeling space 212 to the inside of the modeling space 2123. The powder laying unit 213 is typically is formed in the form to be able to push the material powder, such as a roller or a blade shown in FIG. 8. Although not shown in FIG. 8, the modeling mechanism unit 21 includes a movable mechanism such as a rail, a piston, a motor or the like for moving the powder laying unit 213.

<<1.2. Designing Computer>>

The designing computer 3 is a computer designing three-dimensional shape information which is a source of a three-dimensional object. An example of the designing computer 3 is a personal computer, a tablet, or a smartphone. The designing computer 3 generates information on the shapes (cross-sectional shapes) of a plurality of cross-sectional layers (slices) obtained by dividing a three-dimensional shape by a plane parallel to a predetermined plane at least from three-dimensional shape information, and transmits the information to the controller 22 of the modeling apparatus 2. Hereinafter, a process of generating a plurality of cross-sectional shapes from such three-dimensional shape information is referred to as slicing in some cases.

In addition to the slicing program for performing slicing, for example, the designing computer 3 may execute the following programs.

CAD program for designing a three-dimensional object.

Simulation program that simulates mechanical deformation and thermal expansion based on the shape of a three-dimensional object.

The slicing program may include functions of a CAD program, a simulation program, and other programs. In addition, the CAD program and the simulation program may include a function of performing slicing.

<<1.3. Outline of Operation of Modeling Mechanism Unit>>

Figure 1:
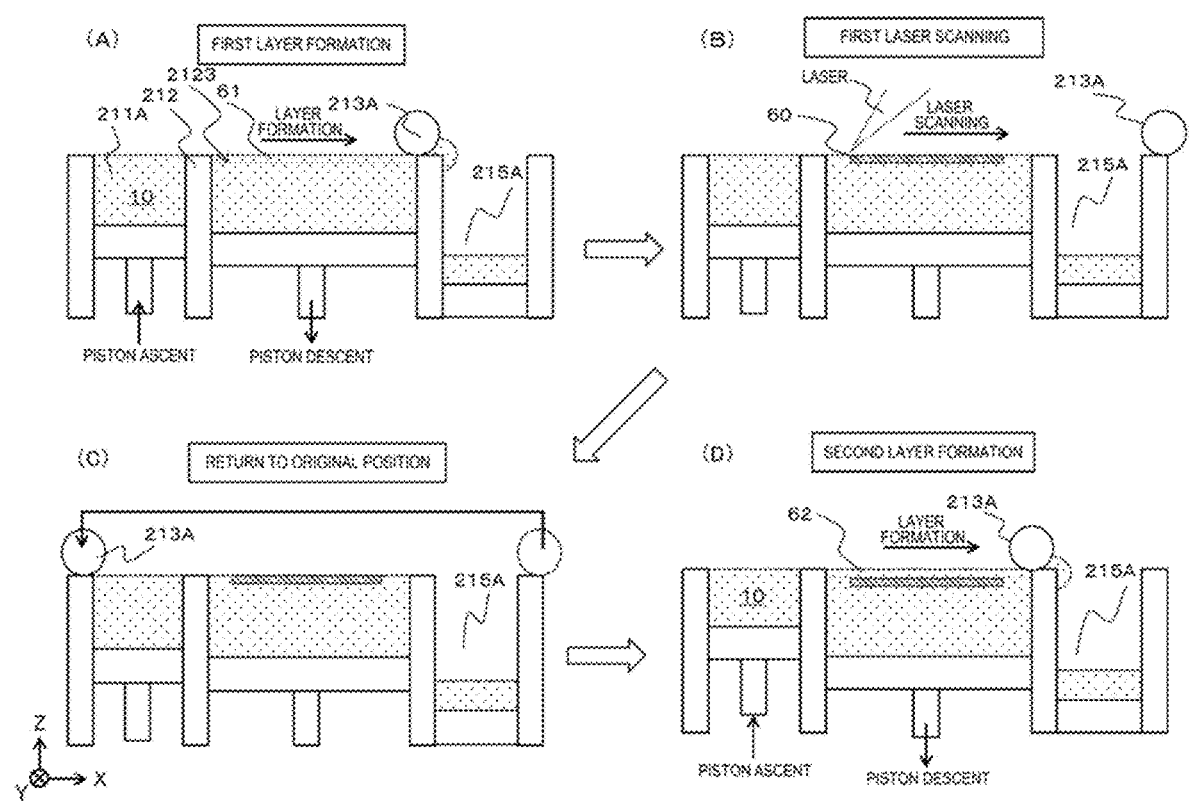
FIG. 1 is a diagram for describing one embodiment of a powder layered modeling method by a powder layered modeling apparatus.

FIG. 1 is a diagram for describing one example of a powder layered modeling method by a powder layered modeling apparatus. FIG. 1 shows an example of a case where a powder layered modeling method using the modeling unit 212, one powder supply unit 211A, one powder laying unit 213A of the modeling mechanism unit 21. In FIG. 1, a powder collecting unit 215 which is not shown in FIG. 8 is shown. However, the modeling mechanism unit 21 may not include the powder collecting unit 215.

The powder layered modeling method by the powder layered modeling apparatus is a method for modeling a three-dimensional object by moving a material powder 10 using the powder laying unit 213A (described as a roller in the drawing), laying a layer 61 of the material powder (hereinafter, sometimes referred to as a material powder layer), supplying energy (for example, applying laser) thereonto from the energy supply unit 23 (not shown in FIG. 1), and melting and sintering the material powder of the material powder layer (melting or sintering is determined depending on the material powder).

As an example of the powder layered modeling method, first, as shown in (A) of FIG. 1, the material powder 10 is moved from the powder supply unit 211A in which the material powder 10 is accumulated to a modeling area 2123 of the modeling unit 212 using the powder laying unit 213A, and the material powder layer 61 is laid. Next, shown in (B) of FIG. 1, the energy from the energy supply unit 23 is supplied (for example, laser or the like is applied) to a position corresponding to a first cross-sectional layer of a three-dimensional object on the laid material powder layer 61, so that the material powder 10 at the position to which the energy is supplied is melted or sintered to mold a first cross-sectional layer 60. Subsequently, as shown in (C) of FIG. 1, the powder laying unit 213A is returned to the initial position (original position) of the powder laying unit 213 and then as shown in (D) of FIG. 1, the material powder 10 is moved to the modeling area 2123 of the modeling unit 212 using the powder laying unit 213A and a material powder layer 62 is laid to mold a second cross-sectional layer. Then, as shown in (B) of FIG. 1, the energy from the energy supply unit 23 is supplied to a position corresponding to a second cross-sectional layer of the three-dimensional object on the laid material powder layer 62, so that the material powder 10 at the position to which the energy is supplied is melted or sintered to mold a three-dimensional object in which the first cross-sectional layer and the second cross-sectional layer are joined. BY repeatedly performing such processes, an arbitrary three-dimensional object constituted of a plurality of cross-sectional layers can be layered and molded.

<<3. Material Powder and Necessity of Laying Material Powder Layer from Multidirection>>

In the powder layered modeling method, as the powder included in the material powder, from the viewpoint of dimensional accuracy and tensile strength, a powder of crystalline resin (resin powder) is used. Examples of the crystalline resin to be used include polyamide 12 (PA12), polyamide 11 (PA11), polypropylene (PP), polyethylene (PE), polyoxymethylene (POM), polybutylene terephthalate (PBT), polyamide 6 (PA6), polyamide 6-6 (PA6-6), PPS, and PEEK. However, as long as the crystalline resin powder is used as a main material, an alloy or blend with an amorphous resin may be included in the material powder. In addition, in the embodiment, in order to improve the strength and the dimensional accuracy of a molded article, a material powder obtained by mixing filler particles having an average length of 1 mm or less with a resin powder is used. As the material of the filler particles, glass, carbon, and the like may be used.

One problem in the powder layered modeling method is anisotropy of tensile strength and shrinkage amount occurring when a filler is mixed with the martial powder. When the material powder is laid using the powder laying unit 213A or the like, a filler having a fiber shape (having a longitudinal direction) tends to be preferentially oriented in a direction parallel to a movement direction of the powder laying unit 213A. That is, in a case of the example in FIG. 1, the filler particles included in the material powder are preferentially oriented in an X direction, which is a movement direction, on the upper surface of the material powder layer on the modeling space 2123 of the powder laying unit 213A. In a case where the filler is biased and oriented in one direction, bending or a decrease in tensile strength occurs in a Y direction in which there is little orientation in the molded three-dimensional object (also referred to as a molded article) or the like, compared to the X direction. In addition, anisotropy is exhibited in the linear expansion coefficient and the shrinkage of the molded article and thus there is a possibility of occurrence of unintended deformation in the molded article.

In this manner, in the powder layered modeling method shown in FIG. 1, the powder laying unit 213A when the material powder layer is laid is moved only one direction. Therefore, the orientation of the filler is biased and thus anisotropy of tensile strength and shrinkage due to the orientation bias cannot be prevented.

Herein, in a case where the material powder layer is laid using a roller as the powder laying unit while setting the movement direction thereof to one direction, to mold a three-dimensional object, the test results of the tensile strength and the shrinkage of the three-dimensional object and the degree of orientation of the filler are shown in Table 1.

TABLE 1

|  | Roller movement direction | Direction vertical to roller movement direction | Without filler |
|---|---|---|---|
| Tensile strength [Mpa] | 60 to 65 | 45 to 50 | 50 to 55 |
| Shrinkage [%] | 1.3 to 1.4 | 2.6 to 2.7 | 3.6 to 3.7 |
| Degree of orientation [%] | 65 to 75 | 25 to 35 | — |

The test was conducted under the following conditions.

30 wt % of a glass filler was mixed with a PBT resin powder.

The average length of the glass filler was 100 μm and the average diameter was 10 μm (aspect ratio: 10).

According to the test, as shown in Table 1, in the roller movement direction of the three-dimensional object, the tensile strength was 60 to 65 (60 or more and less than 65) [MPa], the shrinkage was 1.3 to 1.4 [%], and the rate of the longitudinal direction of the glass filler being oriented in the roller movement direction (degree of orientation) was 65 to 75 [%]. On the other hand, in the direction vertical to the roller movement of the three-dimensional object (direction vertical to roller movement direction), the tensile strength was 45 to 50 [MPa], the shrinkage was 2.6 to 2.7 [%], and the rate of the longitudinal direction of the glass filler being oriented in the direction vertical to the roller movement direction (degree of orientation) was 25 to 35 [%]. In a case where the filler was mot mixed with the material powder, the tensile strength of the three-dimensional object was 50 to 55 [MPa] and the shrinkage was 3.6 to 3.7 [%].

From the test results, it was found that the longitudinal direction of the glass filler was preferentially oriented in the movement direction of the powder laying unit (roller movement direction) when the material powder layer was formed, and the molded three-dimensional object exhibited high tensile strength and small shrinkage in the roller movement direction. From this, it is found that anisotropy occurs in the tensile strength and shrinkage between the roller movement direction and the direction vertical to the roller movement in the three-dimensional object under the influence of the orientation of the glass filler.

In the powder layered modeling apparatus according to the embodiment, the orientation state of the glass filler is controlled by providing the plurality of powder laying units movable in different directions, which are not parallel to each other, so that adjustment such as reduction of anisotropy of tensile strength and shrinkage or reinforcement of anisotropy of tensile strength and shrinkage, can be made. The details will be described below.

<<4. Variations of Modeling Mechanism Unit>>

First, variations of the modeling mechanism unit 21 shown in FIG. 8 will be described in detail.

<<4.1. Variation 1>>

Figure 2:
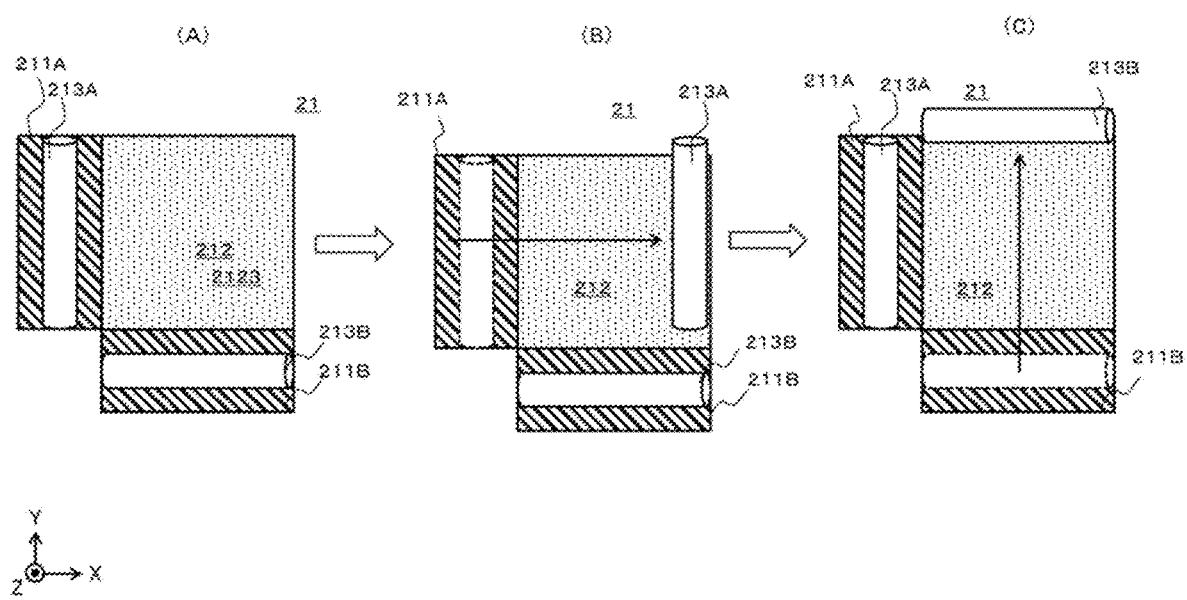
FIG. 2 is a diagram for describing a powder layered modeling apparatus and a powder layered modeling method according to Embodiment 1.

FIG. 2 is a diagram for describing a powder layered modeling apparatus and a powder layered modeling method according to Embodiment 1.

FIG. 2 shows a state in which a plane including the upper surface of the material powder layer formed by the modeling unit 212 of the modeling mechanism unit 21 (the upper surface of the material powder layer) is observed from the upper viewpoint.

As shown in (A) of FIG. 2, a modeling mechanism unit 21 of a modeling apparatus 2 according to Embodiment 1 includes a modeling unit 212, a powder supply unit (an example of a first powder supply unit) 211A, a powder laying unit (an example of a first powder laying unit) 213A, a powder supply unit (an example of a second powder supply unit) 211B, and a powder laying unit (an example of a second powder laying unit) 213B.

The powder supply unit 211A is provided adjacent to the side portion of the rectangular modeling unit 212 opposite to the X direction and can supply the material powder. The powder laying unit 213A moves the material powder supplied by the powder supply unit 211A on the upper surface of the material powder layer along a predetermined direction (first direction: X direction in the drawing) to lay the material powder layer in the modeling unit 212.

The powder supply unit 211B is provided adjacent to the side portion of the modeling unit 212 on the opposite side of the Y direction and can supply the material powder. The powder laying unit 213B moves the material powder supplied by the powder supply unit 211B on the upper surface of the material powder layer along a direction not parallel to the X direction (second direction: the Y direction vertical to the X direction in the embodiment) to lay the material powder layer in the modeling unit 212.

The powder layered modeling method by the modeling mechanism unit 21 will be described.

First, from the state shown in (A) of FIG. 2, as shown in (B) of FIG. 2, the powder supply unit 211A moves the accumulated material powder to the upper part and the powder laying unit 213A is moved in the X direction and moves the material powder moved to the upper part of the powder supply unit 211A so as to lay the material powder layer in the modeling space 2123 of the modeling unit 212. Thereafter, the energy from the energy supply unit 23 is supplied to a position corresponding to one cross-sectional layer of a three-dimensional object on the laid material powder layer and the material powder at the position to which the energy is supplied is melted or sintered to mold one cross-sectional layer. Then, the powder laying unit 213A is moved to the original position.

Next, as shown in (C) of FIG. 2, the powder supply unit 211B moves the accumulated material powder to the upper part, and the powder laying unit 213B is moved in the Y direction and moves the material powder moved to the upper part of the powder supply unit 211B to lay the material powder layer in the modeling unit 212. Thereafter, the energy from the energy supply unit 23 is supplied to a position corresponding to the next cross-sectional layer of the three-dimensional object on the laid material powder layer and the material powder at the position to which the energy is supplied is melted or sintered to mold the next cross-sectional layer.

Since the modeling mechanism unit 21 includes the powder laying unit 213A and the powder laying unit 213B moving different directions on the upper surface of the material powder layer, by laying the material powder layers by all of the powder laying units, the orientation state of the filler in the material powder layer can be controlled.

For example, in a case where a three-dimensional object is molded by a process in which the material powder layer is laid alternately by the powder laying unit 213A and the powder laying unit 213B, it is possible to mold a three-dimensional object in which the orientation state of the filler for each sectional layer is changed by approximately 90° and to significantly reduce the anisotropy of tensile strength and shrinkage in the three-dimensional object in the X and Y directions.

In addition, in a case where a three-dimensional object is molded by moving the powder laying units such that the longitudinal direction of the cross-sectional layer of the three-dimensional object matches with the movement direction of the powder laying unit to lay the material powder layer, a molded article in which the filler is preferentially oriented in the longitudinal direction is obtained and thus the shrinkage amount of the entire the molded article can be reduced.

In the modeling mechanism unit 21 shown in FIG. 2, the movement directions of the powder laying unit 213A and the powder laying unit 213B are set to be orthogonal to each other, but these movement directions are not necessarily set to be orthogonal to each other. As long as the movement directions are parallel to each other, in other words, an angle formed between the movement directions is not zero, the design may be freely changed according to the desired orientation state of the filler.

<<4.2. Variation 2>>

Next, Embodiment 2 will be described. The matters described in Embodiment 1 and not described in this embodiment can also be applied to this embodiment as long as there is no special circumstance.

Figure 3:
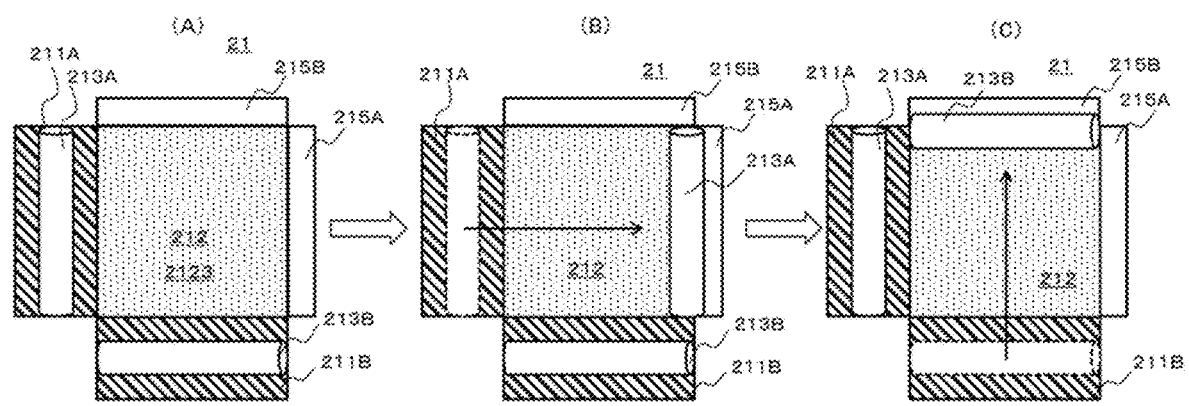
FIG. 3 is a diagram for describing a powder layered modeling apparatus and a powder layered modeling method according to Embodiment 2.
Figure 3:

FIG. 3 is a diagram for describing a powder layered modeling apparatus and a powder layered modeling method according to Embodiment 2.

The modeling mechanism unit 21 according to the embodiment further has a powder collecting unit 215A and a powder collecting unit 215B compared to the modeling mechanism unit according to Embodiment 1.

The powder collecting unit 215A is disposed on the side opposite to the powder supply unit 211A while holding the modeling space 2123 of the modeling unit 212 therebetween. The powder collecting unit 215A collects excess material powder of the material powder moved by the powder laying unit 213A, which is not used for laying the material powder layer in the modeling unit 212. The powder collecting unit 215B is disposed on the side opposite to the powder supply unit 211B while holding the modeling space 2123 of the modeling unit 212 therebetween. The powder collecting unit 215B collects excess material powder of the material powder moved by the powder laying unit 213B, which is not used for laying the material powder layer in the modeling unit 212.

The powder layered modeling method in the embodiment will be described.

First, from the state shown in (A) of FIG. 3, as shown in (B) of FIG. 3, the powder supply unit 211A moves the accumulated material powder to the upper part and the powder laying unit 213A is moved in the X direction and moves (sweeps) the material powder moved to the upper part of the powder supply unit 211A to lay the material powder layer in the modeling unit 212. Here, since the amount of the material powder moved to the upper part from the powder supply unit 211A is equal to or more than the amount of the material powder layer to be laid in the modeling unit 212, the powder laying unit 213A passes through the modeling unit 212 and then further moves excess material powder. When the powder laying unit 213A passes through the modeling unit 212 in this manner, excess material powder is moved onto the powder collecting unit 215A, drops into the powder collecting unit 215A, and then is collected.

On the other hand, as shown in (C) of FIG. 3, after the powder supply unit 211B moves the accumulated material powder to the upper part and the powder laying unit 213B is moved in the Y direction and moves the material powder moved to the upper part of the powder supply unit 211B to lay the material powder layer in the modeling unit 212, as described above, when the powder laying unit 213B passes through the modeling unit 212, excess material powder is moved onto the powder collecting unit 215B, drops into the powder collecting unit 215B, and then is collected.

According to the above-described modeling mechanism unit 21, since the excess material powder is collected by the powder collecting units 215A and 215B, scattering of the material powder to the surroundings and the like can be appropriately prevented. In addition, since the excess material powder can be accumulated in the powder collecting units 215A and 215B, the material powder that can be reused as a recycle material can be easily collected.

<<4.3. Variation 3>>

Next, Embodiment 3 will be described. The matters described in Embodiments 1 and 2 and not described in this embodiment can also be applied to this embodiment as long as there is no particular circumstance.

Figure 4:
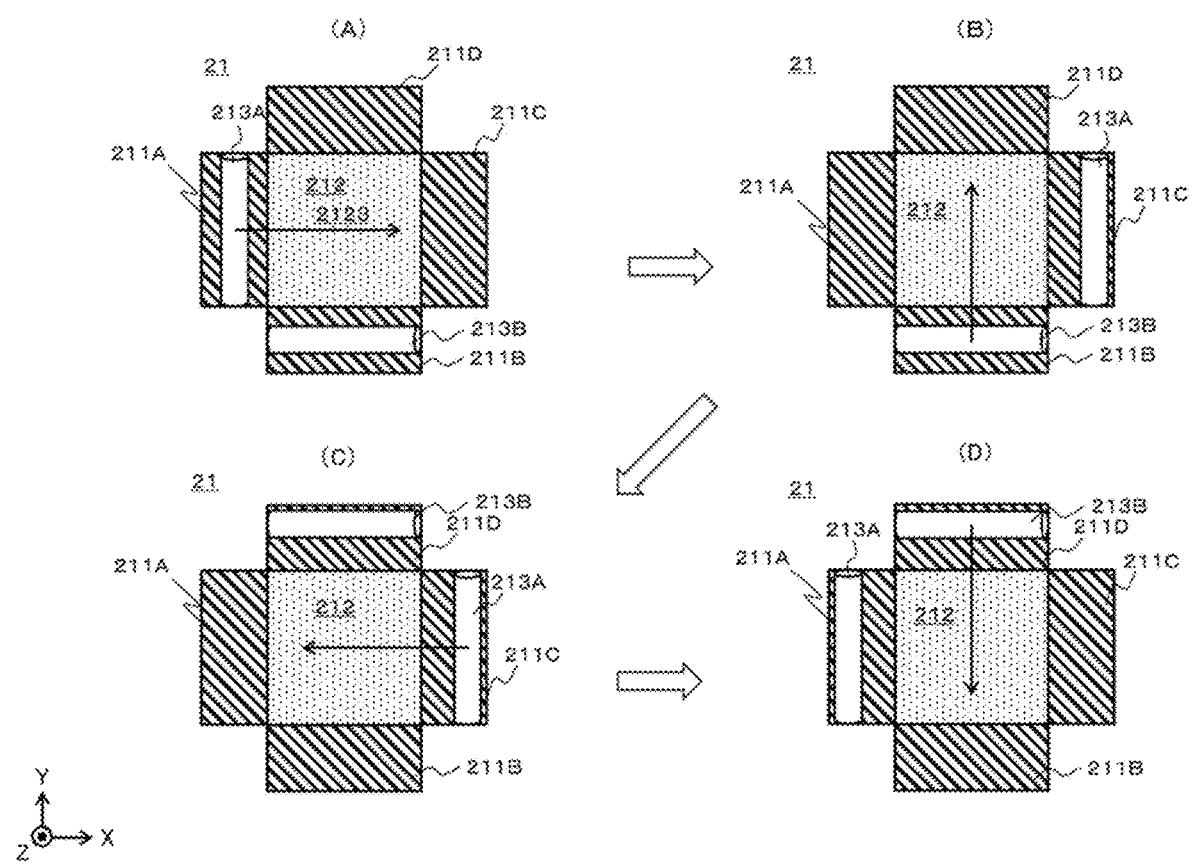
FIG. 4 is a diagram for describing a powder layered modeling apparatus and a powder layered modeling method according to Embodiment 3.

FIG. 4 is a diagram for describing a powder layered modeling apparatus and a powder layered modeling method according to Embodiment 3.

The modeling mechanism unit 21 according to the embodiment further has a powder supply unit 211C which is disposed on the side opposite to the modeling space 2123 of the modeling unit 212 with respect to the powder supply unit 211A, and a powder supply unit 211D which is disposed on the side opposite to the powder supply unit 211B and the modeling space 2123, compared to the modeling mechanism unit according to Embodiment 1, the powder laying unit 213A has a reciprocating mechanism between the powder supply unit 211A and the powder supply unit 211C, and the powder laying unit 213B has a reciprocating mechanism between the powder supply unit 211B and the powder supply unit 211D.

The powder layered modeling method in the embodiment will be described.

First, as shown in (A) in FIG. 4, the powder supply unit 211A moves the accumulated material powder to the upper part and the powder laying unit 213A is moved in the X direction and moves the material powder moved to the upper part of the powder supply unit 211A to lay the material powder layer in the modeling unit 212. The powder laying unit 213A is moved to the end on the side of the powder supply unit 211C. Then, the energy from the energy supply unit 23 is supplied to a position corresponding to the one cross-sectional layer of a three-dimensional object on the laid material powder layer and the material powder at the position to which the energy is supplied is melted or sintered to mold one cross-sectional layer.

Next, as shown in (B) of FIG. 4, the powder supply unit 211B moves the accumulated material powder to the upper part and the powder laying unit 213B is moved in the Y direction and moves the material powder moved to the upper part of the powder supply unit 211B to lay the material powder layer in the modeling unit 212. The powder laying unit 213B is moved to the end on the side of the powder supply unit 211D. Then, the energy from the energy supply unit 23 is supplied to a position corresponding to the one cross-sectional layer of the three-dimensional object on the laid material powder layer and the material powder at the position to which the energy is supplied is melted or sintered to mold one cross-sectional layer.

Next, as shown in (C) of FIG. 4, the powder supply unit 211C moves the accumulated material powder to the upper part and the powder laying unit 213A is moved in a direction opposite to the X direction and moves the material powder moved to the upper part of the powder supply unit 211C to lay the material powder layer in the modeling unit 212. The powder laying unit 213A is moved to the end (original position) on the side of the powder supply unit 211A. Then, the energy from the energy supply unit 23 is supplied to a position corresponding to the one cross-sectional layer of the three-dimensional object on the laid material powder layer and the material powder at the position to which the energy is supplied is melted or sintered to mold one cross-sectional layer.

Next, as shown in (D) of FIG. 4, the powder supply unit 211D moves the accumulated material powder to the upper part and the powder laying unit 213B is moved in a direction opposite to the Y direction and moves the material powder moved to the upper part of the powder supply unit 211D to lay the material powder layer in the modeling unit 212. The powder laying unit 213B is moved to the end on the side of the powder supply unit 211B. Then, the energy from the energy supply unit 23 is supplied to a position corresponding to the one cross-sectional layer of the three-dimensional object on the laid material powder layer and the material powder at the position to which the energy is supplied is melted or sintered to mold one cross-sectional layer.

As described above, according to the modeling mechanism unit 21 of the embodiment, since it is not necessary to return the powder laying unit 213A and the powder laying unit 213B to the original position each time in order to lay the material powder layer, the laying time of the material powder layer can be shortened, and as a result, the modeling time can be shortened.

<<4.4. Variation 4>>

Next, Embodiment 4 will be described. The matters described in Embodiments 1 to 3 and not described in this embodiment can also be applied to this embodiment as long as there is no particular circumstance.

Figure 5:
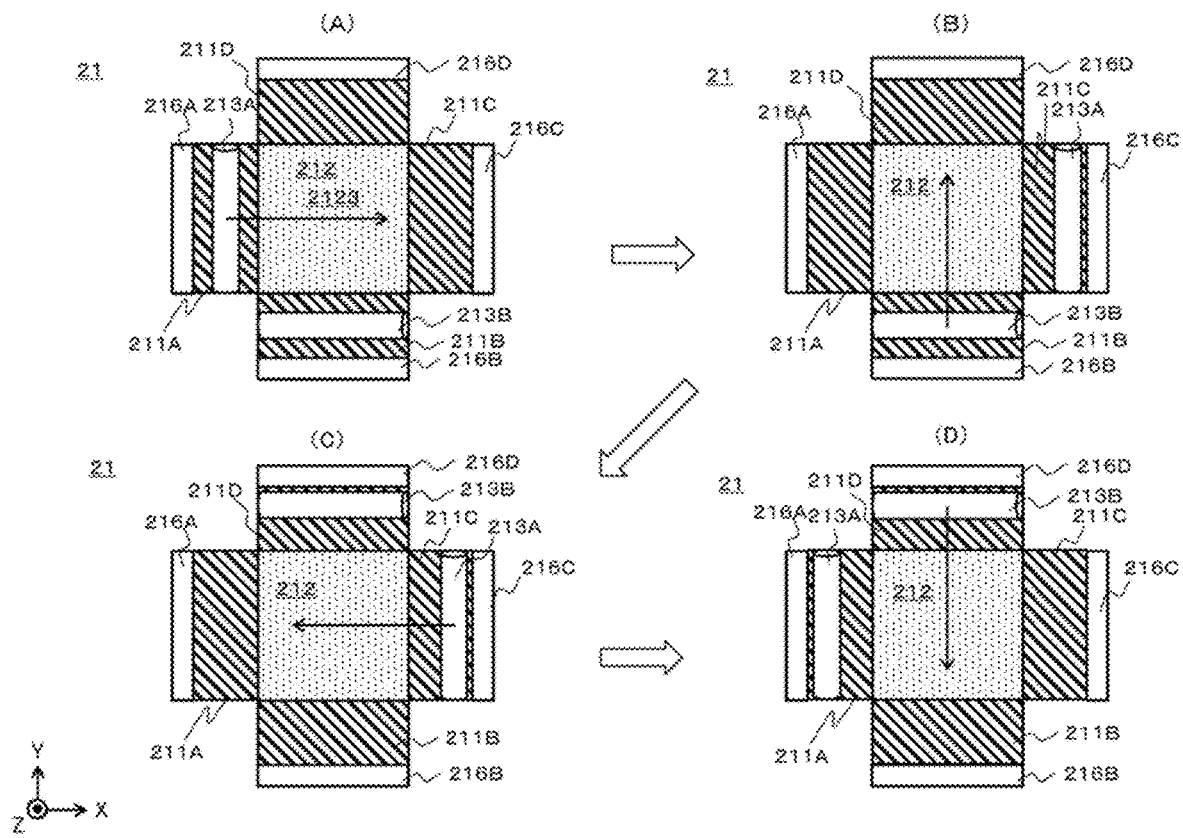
FIG. 5 is a diagram for describing a powder layered modeling apparatus and a powder layered modeling method according to Embodiment 4.

FIG. 5 is a diagram for describing a powder layered modeling apparatus and a powder layered modeling method according to Embodiment 4.

The modeling mechanism unit 21 according to the embodiment further has a powder collecting unit 216A which is provided on the side opposite to the modeling unit 212 with respect to the powder supply unit 211A, a powder collecting unit 216B which is provided on the side opposite to the modeling unit 212 with respect to the powder supply unit 211B, a powder supply unit 216C which is provided on the side opposite to modeling unit 212 with respect to the powder supply unit 211C, and a powder collecting unit 216D which is provided on the side opposite to the modeling unit 212 with respect to the powder supply unit 211D, compared to the modeling mechanism unit according to Embodiment 3.

The powder layered modeling method in the embodiment will be described.

For example, as shown in (A) of FIG. 5, the powder laying unit 213A is moved in the X direction and moves the material powder moved to the upper part of the powder supply unit 211A to lay the material powder layer in the modeling unit 212. Then, when the powder laying unit 213A passes through the modeling unit 212 and reaches the end of the material supply unit 211C, excess material powder is moved onto the powder collecting unit 216C, drops into the powder collecting unit 216C, and then is collected.

In addition, as shown in (B) of FIG. 5, the powder laying unit 213B is moved in the Y direction and moves the material powder moved to the upper part of the powder supply unit 211B to lay the material powder layer in the modeling unit 212. Then, when the powder laying unit 213B passes through the modeling unit 212 and reaches the end of the material supply unit 211D, excess material powder is moved onto the powder collecting unit 216D, drops into the powder collecting unit 216D, and then is collected.

In addition, as shown in (C) of FIG. 5, the powder laying unit 213A is moved in a direction opposite to the X direction and moves the material powder moved to the upper part of the powder supply unit 211C to lay the material powder layer in the modeling unit 212. Then, when the powder laying unit 213A passes through the modeling unit 212 and reaches the end of the material supply unit 211A, excess material powder is moved onto the powder collecting unit 216A, drops into the powder collecting unit 216A, and then is collected.

Further, as shown in (D) of FIG. 5, the powder supply unit 213B is moved in a direction opposite to the Y direction and moves the material powder moved to the upper part of the powder supply unit 211D to lay the material powder layer in the modeling unit 212. Then, when the powder laying unit 213B passes through the modeling unit 212 and reaches the end of the material supply unit 211B, excess material powder is moved onto the powder collecting unit 216B, drops into the powder collecting unit 216B, and then is collected.

As described above, according to the modeling mechanism unit 21 of the embodiment, the excess material powder can be collected and stored in the powder collecting units 216A, 216B, 216C, and 216D. Thus, in addition to the effects of Embodiment 3, scattering of the material powder to the surroundings and the like can be appropriately prevented, and the material powder that can be reused as a recycle material can be easily collected.

<<4.5. Variation 5>>

Next, Embodiment 5 will be described. The matters described in Embodiments 1 to 4 and not described in this embodiment can also be applied to this embodiment as long as there is no particular circumstance.

Figure 6:
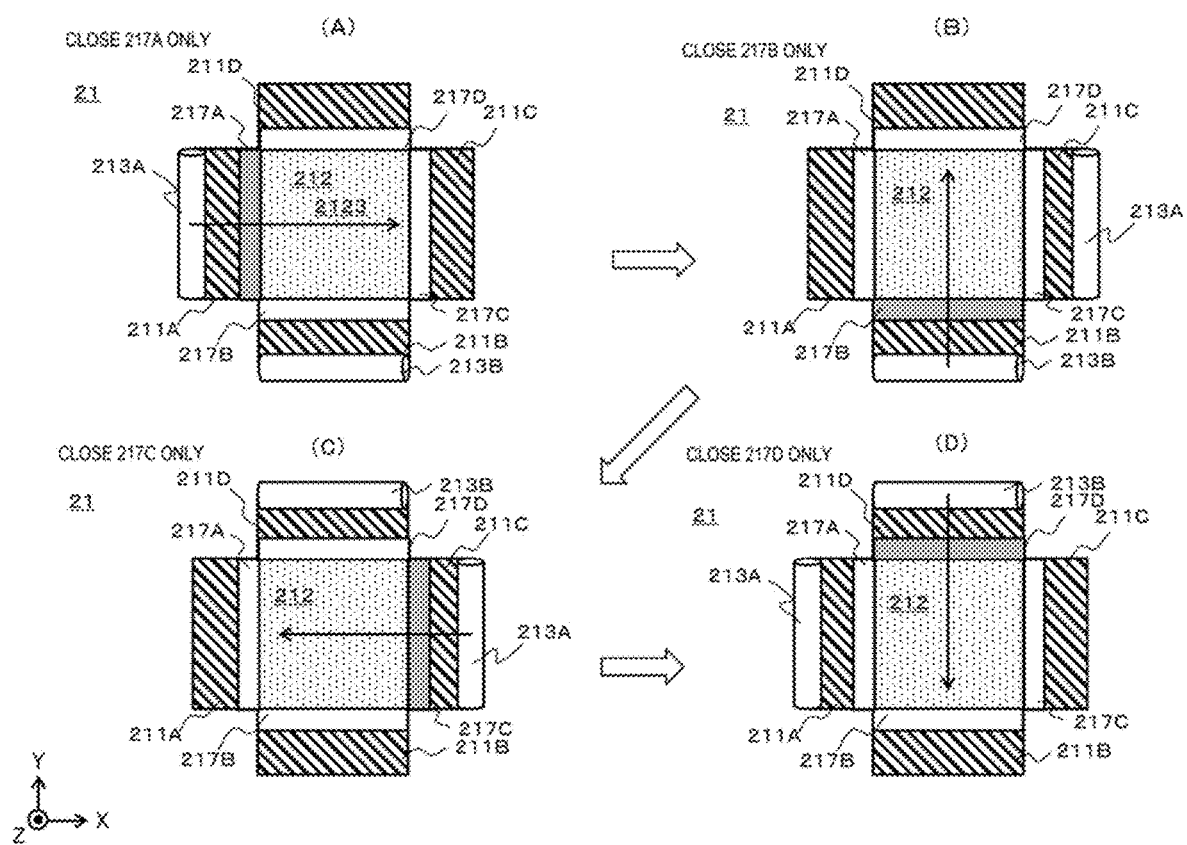
FIG. 6 is a diagram for describing a powder layered modeling apparatus and a powder layered modeling method according to Embodiment 5.

FIG. 6 is a diagram for describing a powder layered modeling apparatus and a powder layered modeling method according to Embodiment 5.

The modeling mechanism unit 21 according to the embodiment further has powder collecting units 217A, 217B, 217C, and 217D compared to the modeling mechanism unit of Embodiment 3. The powder collecting unit 217A is disposed between the powder supply unit 211A and the modeling unit 212. The powder collecting unit 217B is disposed between the powder supply unit 211B and the modeling unit 212. The powder collecting unit 217C is disposed between the powder supply unit 211C and the modeling unit 212. The powder collecting unit 217D is disposed between the powder supply unit 211D and the modeling unit 212. The powder collecting units 217A, 217B, 217C, and 217D, respectively have a shutter mechanism that is capable of opening and closing an opening which can collect the powder of the upper part. The shutter mechanism is opened and closed according to control of the controller 22.

The powder layered modeling method in the embodiment will be described.

In a case where the material powder layer is laid in the modeling unit 212 by the material powder supplied from the powder supply unit 211A, as shown in (A) of FIG. 6, the controller 22 performs control such that the shutter mechanism of the powder collecting unit 217A is in a closed state and the shutter mechanisms of the powder collecting units 217B, 217C, and 217D are in an open state. Next, the powder laying unit 213A is moved in the X direction and moves the material powder moved to the upper part of the powder supply unit 211A while causing the material powder to pass through the upper part of the powder collecting unit 217A, so that the material powder layer is laid in the modeling unit 212. When the powder laying unit 213A is moved in this manner, there is a case where excess material powder overflows to the side surface side of the powder laying unit 213A (that is, the side of the powder collecting units 217B and 217D). In this case, the excess material powder passes through the modeling space 2123 heated to a high temperature and thus there is a risk of deterioration due to thermal history from the modeling space 2123. When the deteriorated material powder is laid in the modeling space 2123 later, there is a risk that the dimensional accuracy and the tensile strength of a three-dimensional object to be molded may be adversely affected.

In contrast, in the embodiment, the material powder overflowing from the side of the powder laying unit 213A drops and is collected in the powder collecting unit 217B and the powder collecting unit 217D. In addition, by movement of the powder laying unit 213A, before the excess material powder passed through the modeling unit 212 reaches the powder supply unit 211C, the excess material powder drops and is collected in the powder collecting unit 217C. Accordingly, the material powder of the powder supply units 211B, 211C, and 211D can be appropriately prevented from being contaminated due to the deteriorated material powder.

Thereafter, in a case where the material powder layer is laid in the modeling unit 212 by the material powder supplied from the powder supply unit 211B, as shown in (B) of FIG. 6, the controller 22 performs control such that the shutter mechanism of the powder collecting unit 217B is in a closed state and the shutter mechanisms of the powder collecting units 217A, 217C, and 217D are in an open state. Next, the powder laying unit 213B is moved in the Y direction and moves the material powder moved to the upper part of the powder supply unit 211B while causing the material powder to pass through the upper part of the powder collecting unit 217B, so that the material powder layer is laid in the modeling unit 212. When the powder laying unit 213B is moved in this manner, there is a case where excess material powder overflows to the side surface side of the powder laying unit 213B (that is, the side of the powder collecting units 217A and 217C). However, the material powder overflowed from the side of the powder laying unit 213B drops and is collected in the powder collecting unit 217A and the powder collecting unit 217C. In addition, by movement of the powder laying unit 213B, before the excess material powder passed through the modeling unit 212 reaches the powder supply unit 211D, the excess material powder drops and is collected in the powder collecting unit 217D. Accordingly, the material powder of the powder supply units 211A, 211C, and 211D can be appropriately prevented from being contaminated due to the deteriorated material powder.

Thereafter, in a case where the material powder layer is laid in the modeling unit 212 by the material powder supplied from the powder supply unit 211C, as shown in (C) of FIG. 6, the controller 22 performs control such that the shutter mechanism of the powder collecting unit 217C is in a closed state and the shutter mechanisms of the powder collecting units 217A, 217B, and 217D are in an open state. Next, the powder laying unit 213A is moved in a direction opposite to the X direction and moves the material powder moved to the upper part of the powder supply unit 211C while causing the material powder to pass through the upper part of the powder collecting unit 217C, so that the material powder layer is laid in the modeling unit 212. When the powder laying unit 213A is moved in this manner, there is a case where excess material powder overflows to the side surface side of the powder laying unit 213A (that is, the side of the powder collecting units 217B and 217D). However, the material powder overflowed from the side of the powder laying unit 213A drops and is collected in the powder collecting unit 217B and the powder collecting unit 217D. In addition, by movement of the powder laying unit 213A, before the excess material powder passed through the modeling unit 212 reaches the powder supply unit 211A, the excess material powder drops and is collected in the powder collecting unit 217A. Accordingly, the material powder of the powder supply units 211A, 211B, and 211D can be appropriately prevented from being contaminated due to the deteriorated material powder.

Thereafter, in a case where the material powder layer is laid in the modeling unit 212 by the material powder supplied from the powder supply unit 211D, as shown in (D) of FIG. 6, the controller 22 performs control such that the shutter mechanism of the powder collecting unit 217D is in a closed state and the shutter mechanisms of the powder collecting units 217A, 217B, and 217C are in an open state. Next, the powder laying unit 213B is moved in a direction opposite to the Y direction and moves the material powder moved to the upper part of the powder supply unit 211D while causing the material powder to pass through the upper part of the powder collecting unit 217D, so that the material powder layer is laid in the modeling unit 212. When the powder laying unit 213B is moved in this manner, there is a case where excess material powder overflows to the side surface side of the powder laying unit 213B (that is, the side of the powder collecting units 217A and 217C). However, the material powder overflowed from the side of the powder laying unit 213B drops and is collected in the powder collecting unit 217A and the powder collecting unit 217C. In addition, by movement of the powder laying unit 213B, before the excess material powder passed through the modeling unit 212 reaches the powder supply unit 211B, the excess material powder drops and is collected in the powder collecting unit 217B. Accordingly, the material powder of the powder supply units 211A, 211B, and 211C can be appropriately prevented from being contaminated due to the deteriorated material powder.

<<4.6. Variation 6>>

Next, Embodiment 6 will be described. The matters described in Embodiments 1 to 5 and not described in this embodiment can also be applied to this embodiment as long as there is no particular circumstance.

Figure 7:
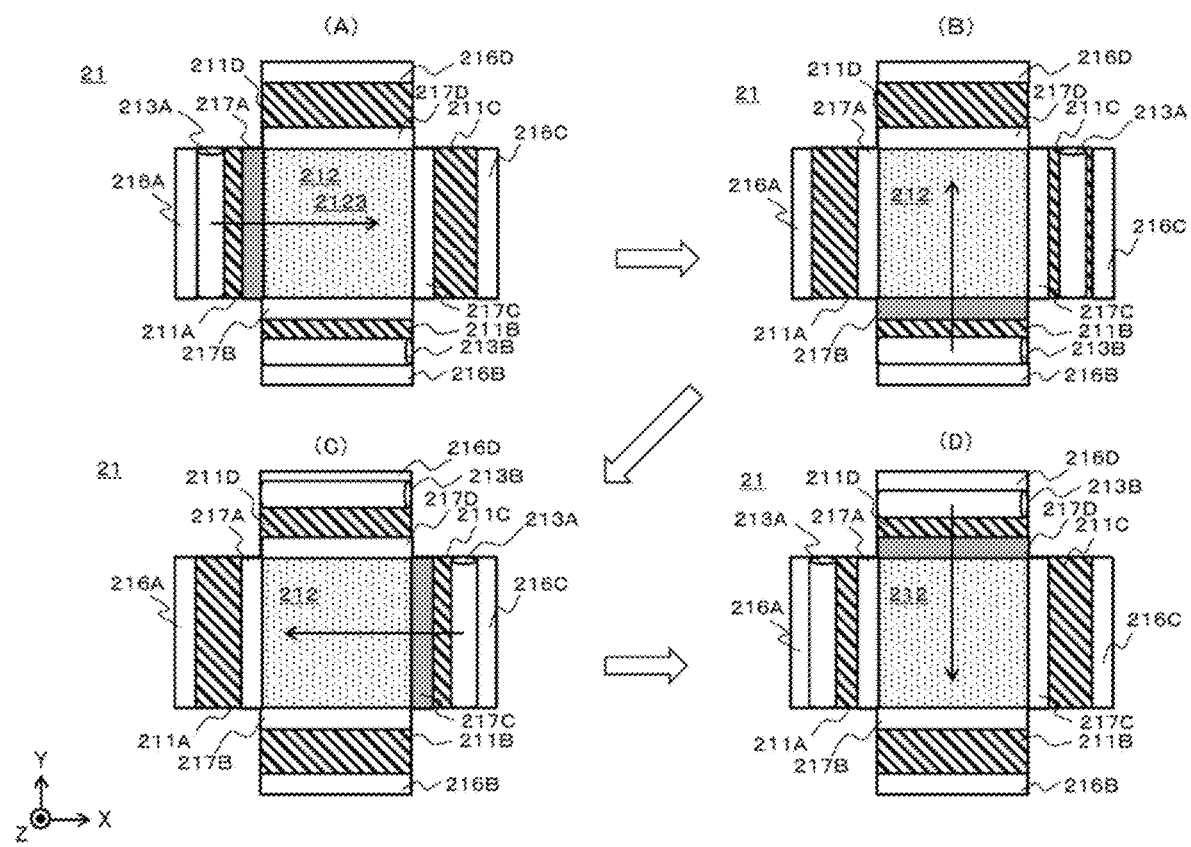
FIG. 7 is a diagram for describing a powder layered modeling apparatus and a powder layered modeling method according to Embodiment 6.

FIG. 7 is a diagram for describing a powder layered modeling apparatus and a powder layered modeling method according to Embodiment 6.

The modeling mechanism unit 21 according to the embodiment further has powder collecting units 216A, 216B, 216C, and 216D compared to the modeling mechanism unit of Embodiment 5. The powder collecting units 216A, 216B, 216C, and 216D have the same configuration as those of the same reference numerals in Embodiment 4.

The powder layered modeling method in the embodiment will be described.

As shown in (A) of FIG. 7, in a case where the powder laying unit 213A is moved in the X direction and the material powder layer is laid in the modeling unit 212 by the material powder supplied from the powder supply unit 211A, before excess material powder passed through the modeling unit 212 reaches the powder supply unit 211A, the excess material powder drops and is collected in the powder collecting unit 217A. However, the excess material powder which was not able to be collected by the powder collecting unit 217A is collected by the powder collecting unit 216C.

Similarly, as shown in (B) of FIG. 7, in a case where the powder laying unit 213B is moved in the Y direction and the material powder layer is laid in the modeling unit 212 by the material powder supplied from the powder supply unit 211B, excess material powder which was not able to be collected by the powder collecting unit 217D is collected by the powder collecting unit 216D. In addition, as shown in (C) of FIG. 7, in a case where the powder laying unit 213A is moved in a direction opposite to the X direction to lay the material powder layer in the modeling unit 212 by the material powder supplied from the powder supply unit 211C, excess material powder which was not able to be collected by the powder collecting unit 217A is collected by the powder collecting unit 216A. Further, as shown in (D) of FIG. 7, in a case where the powder laying unit 213B is moved in a direction opposite to the Y direction to lay the material powder layer in the modeling unit 212 by the material powder supplied from the powder supply unit 211D, excess material powder which was not able to be collected by the powder collecting unit 217B is collected by the powder collecting unit 216B.

According to the embodiment, the material powder not collected by the powder collecting units 217A, 217B, 217C, and 217D provided adjacent to the modeling unit 212 can be collected and stored by the powder collecting units 216A, 216B, 216C, and 216D provided outside of the powder supply units 211A, 211B, 211C, and 211D. Therefore, in addition to the effects of Embodiment 5, a recycle material can be more effectively collected.

<<2. Configuration of Controller>>

Next, the controller 22 will be described.

Figure 9:
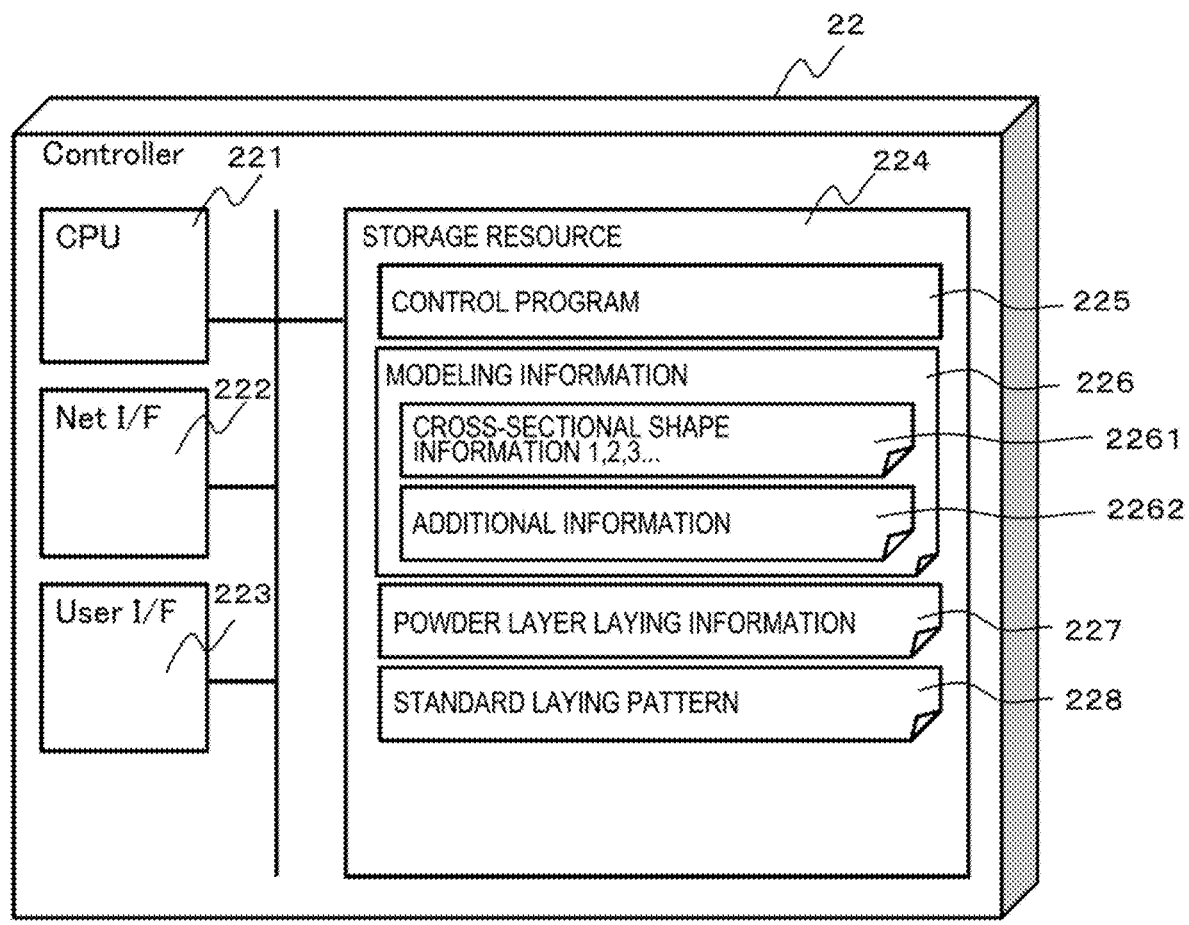
FIG. 9 is a configuration diagram of a controller of a powder layered modeling apparatus according to one embodiment.

FIG. 9 is a configuration diagram of a controller of a powder layered modeling apparatus according to one embodiment.

<<2.1. Hardware>>

The controller 22 is, for example, a personal computer, tablet, or an embedded computer. The controller 22 may be another device as long as the device is a device including at least a CPU 221, a network interface 222 (abbreviated as Net I/F in the drawing), and an internal network connecting these components. The controller 22 may include a user interface 223 (User I/F in the drawing) in addition to these components. The use interface 233 is, for example, a touch panel, a display, a keyboard, a mouse, or a mechanical switch, but as long as it is possible to accept an operation from a user on the modeling apparatus 2 or to display information from the modeling apparatus 2, another device may be used.

The CPU 221 can execute a program stored in a storage resource 224.

The storage resource 224 is a component for storing a program to be executed by the CPU 221 and information used in the program. Incidentally, as an example of the storage resource, a volatile type memory such as a semiconductor memory, a flash memory, or an HDD, and a nonvolatile type memory may be used.

The network interface 222 is an interface for communication with an external computer (for example, designing computer 3) via the network 4. The network interface is also an interface for communicable connection with components of the energy supply unit 23 and the modeling mechanism unit 21. However, there is a case where the communication standards for external computers and the communication standards between components inside the modeling apparatus 2 are different. In this case, a plurality of types of interfaces may be provided. In addition, a plurality of network interfaces may be combined and provided.

<<2.2. Data>>

The controller 22 stores the following information in the storage resource 224. The controller 22 may store information other than these.

Modeling information 226: Modeling information 226 is typically information received from the designing computer 3 via the network 4. The modeling information 226 further includes cross-sectional shape information 2261 indicating shapes of a plurality of cross-sectional layers (cross-sectional shapes) and additional information 2262.

Powder layer laying information 227: The powder layer laying information is information that makes it possible to specify which layer powder laying unit (213A or 213B) is used for laying material powder layers for each cross-sectional layer. One embodiment of the powder layer laying information 227 is realized by storing a plurality of pairs of an ID given to cross-sectional shape information and an ID of the powder laying unit used when modeling a cross-sectional layer corresponding to the cross-sectional shape information (ID pairs). The control program 225 selects a powder laying unit to be used for modeling a predetermined cross-sectional layer by reading the powder layer laying information 227. The powder layer laying information 227 may be generated based on a standard laying pattern 228 to be described later or may be received from designing computer 3.

Standard laying pattern 228: The standard laying pattern 228 is information for determining a powder laying unit (powder laying unit 213A or 213B) for laying the material powder layer when modeling each cross-sectional layer in a case where the modeling information received from the designing computer 3 does not include the powder layer laying information. As examples of the standard laying pattern 228, the standard laying pattern may be "the powder laying units 213A and 213B are alternately used", "after the powder laying unit 213A is used x times, the powder laying unit 213B is used y times", or the like and may be information to specify order of using the powder laying units. For example, an ID pair in the powder layer laying information for a cross-sectional layer without designation for a powder laying unit to be used from the designing computer 3 may be generated according to the standard laying pattern 228. However, in a case of an embodiment in which the powder layer laying information 227 is omitted, the control program 225 may select a powder laying unit used when modeling a predetermined cross-sectional layer by reading the standard laying pattern.

In a case where the standard laying pattern is fixed, the standard laying pattern may be embedded as a program code in the control program 225. One process of the control program 225, the standard laying pattern may be stored by receiving the standard laying pattern from a user via the user interface 223. In addition, a plurality of standard laying patterns may be stored. Further, an indication to select one standard laying pattern from a plurality of standard laying patterns may be received from a user via the user interface.

Cross-sectional shape information 2261 (a plurality of pieces): The cross-sectional shape information 2261 is information indicating the shape of a cross-sectional layer to be molded by supplying energy to a material powder layer. Typically, one material powder layer is laid for one cross-sectional layer, but a plurality of material powder layers may be laid for one cross-sectional layer.

Additional information 2262: The additional information 2262 may optionally store the thickness of the material powder layer.

<<2.3. Control Program>>

The control program 225 stored in the storage resource 224 is executed by the CPU 221 to perform one or more of the following processes.

Modeling control process: An instruction to start modeling or stop modeling is received from the designing computer 3 or the user interface 223 to control starting and stopping of the following processes, or a designation for a standard laying pattern to be used for present modeling from a plurality of standard laying patterns is received. Then, by calling an energy supply process and a powder laying process to be described later, a three-dimensional object is molded. The detailed flow will be described later.

Modeling information receiving process: Modeling information is received from the designing computer 3 and stored in the storage resource 224.

Standard laying pattern setting process: A standard laying pattern is received from the designing computer 3 or the user interface 223 and the standard laying pattern is stored in the storage resource 224.

Powder laying unit designation information receiving process: Powder laying unit designation information for designating which powder laying part is to be used for one or more cross-sectional layers included in the modeling information is received from the designing computer 3 and based on the powder laying unit designation information, an ID pair of the powder layer laying information is created. The powder laying unit designation information is information related to the type of material powder layer in a case of classifying the material powder layer by the cross-sectional layer and the laying method (which powder supply unit to supply the material powder or which powder laying unit to lay the material powder layer). Format examples of the powder laying unit designation information are as follows:

including a pair of an ID given to cross-sectional shape information and an ID of a powder laying unit to be used for modeling the cross-sectional shape (which may be substituted with a direction such as an X direction or a Y direction);

including a list of IDs of cross-sectional shape information for an ID of a predetermined powder laying unit; and including one or more non-standard laying patterns (custom laying patterns) and a list of IDs of cross-sectional shape information to which the custom laying patterns are applied.

Powder layer laying information generation process (standard laying pattern): The modeling information 226 and the powder laying unit designation information are received, a cross-sectional layer for which a powder laying unit to be used cannot be designated by the powder laying unit designation information is specified as a cross-sectional layer to which a standard laying pattern is applied. Then, an ID pair for the specified cross-sectional layer is created with reference to the standard laying pattern and stored in the powder layer laying information. In a case where the powder laying unit designation information is not received, the standard laying pattern may be applied to all cross-sectional layers.

Energy supply process: A signal is generated according to the cross-sectional shape information designated from the modeling control process and the signal is transmitted to the energy supply unit 23 to supply energy to a predetermined position of the material powder layer. In the energy supply process, a signal for stopping energy supply before and after modeling a cross-sectional layer is transmitted to the energy supply unit 23.

Powder laying process: A powder laying unit (213A or 213B) to be used when modeling the cross-sectional layer designated in the modeling control process is specified with reference to the powder layer laying information. Next, the movable bed of the powder supply unit (any one of 211A, 211B, 211C, and 211D) corresponding to the specified powder laying unit is moved upwardly to put the material powder on the upper part of the powder supply unit. Next, the movable bed of the modeling unit 212 is moved downwardly by the thickness of the material powder layer. Next, the powder laying unit is moved and moves the material powder put on the upper part of the powder supply unit to the modeling unit 212 to lay the material powder layer.

Powder layer laying information generation process (generation based on the aspect ratio of the shape of the cross-sectional layer):for each cross-sectional layer of modeling information (a plurality of cross-sectional layers may be collected together), the aspect ratio for all or part of the cross-section layers is calculated. Then, the powder laying unit is selected based on the aspect ratio, and the selection result is stored in the powder layer laying information. Typical methods for selecting a powder laying unit are (A) in a case where the aspect ratio exceeds a predetermined threshold value and is large in the X direction, a powder laying unit moving in the X direction is selected, (B) in a case where the aspect ratio exceeds a predetermined threshold and is large in the Y direction, a powder laying unit moving in the Y direction is selected, and (C) in a case where the aspect ratio is within a predetermined threshold value, the above-mentioned standard laying pattern is applied and the powder laying unit is selected. As a variation of the selection method of (A) or (B), instead of determining a powder laying unit for each individual cross-sectional layer, a laying pattern applied to a plurality of cross-sectional layers may be determined based on the aspect ratio. For example, when 20 cross-sectional layers are used as a calculation unit, in a case where the average aspect ratio of each cross-sectional layer is large in the X direction, the frequency of use of the powder laying unit moving in the X direction in the laying pattern may be increased so as to be related to the size thereof.

<<2.4. Flow of Modeling Control Process>>

The flow when the control program 225 performs the modeling control process will be described below. In the following description, the modeling mechanism unit 21 adopts Variations 1 and 2.

(Step 1) The control program 225 receives a mold start instruction from the network interface 222 or the user interface 223.

(Loop A start) The control program 225 performs Steps A1 to A4 for each of the plurality of cross-sectional layers of the stored modeling information (referred to as a cross-sectional layer (Loop A)) until (Loop A end). Typically, there is only one cross-sectional layer to be looped, but a plurality of cross-sectional layers may be processed collectively in the loop.

(Step A1) The control program 225 selects a powder laying unit for laying the material powder layer for modeling a cross-sectional layer (Loop A). The selected powder laying unit is called a powder laying unit (A1). The powder laying unit is selected with reference to the ID pair of the powder layer laying information 227, but may be selected with reference to information from which the powder layer laying information 227 is generated (for example, the standard laying pattern 228).

(Step A2) The control program 225 designates the powder laying unit (A1) and performs a powder laying process to lay the material powder layer in the modeling unit 212.

(Step A3) The control program 225 detects that the powder laying process is ended and all of the powder laying units are located at a position deviated from the upper part of the modeling unit 212 (accurately, a range in which the energy from the energy supply unit 23 is supplied).

(Step A4) The control program 225 starts energy supply by designating the cross-sectional layer (A1) and performing the energy supply process and molds the cross-sectional layer on the material powder layer. When the modeling of the cross-sectional layer (Loop A) is completed, the energy supply unit 23 stops the energy supply in the energy supply process as described above.

(Loop A End)

(Step 2) The control program 225 performs modeling completion process. In the modeling completion process, for example, the completed three-dimensional object is easily taken out by moving the movable bed of the modeling unit 212 upward, and the three-dimensional object is cooled. However, other processes may be performed.

The above is the flow of modeling control process. In the above-described process operation, energy supply is performed after laying of all of the powder laying units are completed and moving to a position deviated from at least the opening of the modeling unit 212 is completed. However, in order to further reduce the modeling time, the powder laying unit may be moved between the opening of the modeling unit and the energy supply unit 23 and then energy supply may be started.

It is needless to say that the flow can be applied to Variations 3 and 4 shown in FIGS. 4 and 5. Specifically, the movement direction of the powder laying unit is considered as a reciprocating movement direction. Then, in the powder laying process, the current position of each powder laying unit in the vicinity of which powder supply unit (for example, at the upper end of the powder supply unit or above the powder collecting unit) is stored and at the time of laying, the powder laying unit may be moved to the powder supply unit corresponding to the current position via the modeling unit 212.

The same applies to Variation 5 shown in FIG. 6. In this case, in addition to the case where the flow is applied to Variations 3 and 4, the powder supply process may perform control to close the shutter mechanism of the powder collecting unit between the powder laying unit currently located and the modeling unit 212 and open the shutter mechanism after the powder laying unit is passed.

The modeling information does not necessarily have to receive the shape of all of the cross-sectional layers before the start of modeling, and at least the shape of the cross-sectional layer to be processed in the loop and the ID pair of the powder layer laying information corresponding to the cross-sectional shape may be stored in the controller 22.

<<2.5. Other Uses of Standard Laying Pattern>>

In the modeling apparatus 2 described above, a material powder not containing filler particles can also be used.

In this case, at least one powder laying unit and a powder supply unit which supplies the material powder to the powder laying unit may be provided. In addition, in the powder supply unit, which is not used for modeling, the material powder containing filler particles does not need to be replaced with a material powder not containing filler particles, and thus the use of the apparatus becomes easy. Therefore, it may be possible to temporarily invalidate a powder laying unit that is not used for modeling and a powder supply unit that supplies the material powder to the powder laying unit. The embodiments thereof are as follows.

The control program receives (or accepts) designation of the powder supply unit or powder laying unit to be invalidated from a user (designation of non-use of filler) and selects a pattern not using these units as a standard laying pattern.

The control program receives (or accepts) designation of the powder laying unit for laying the material powder layer with the material powder not containing filler particles from a user, and uses the designated powder laying unit.

In addition, even in a case where the material powder not containing filler particles is used and two powder laying units are used in modeling, the material powder for any of the powder supply units may be insufficient. In this case, an option for change to modeling not using the powder supply unit in which the material powder is insufficient by updating the standard laying pattern or powder laying information even during modeling may be received from a user.

<<3. Configuration of Designing Computer>>

Next, the designing computer 3 will be described.

Figure 10:
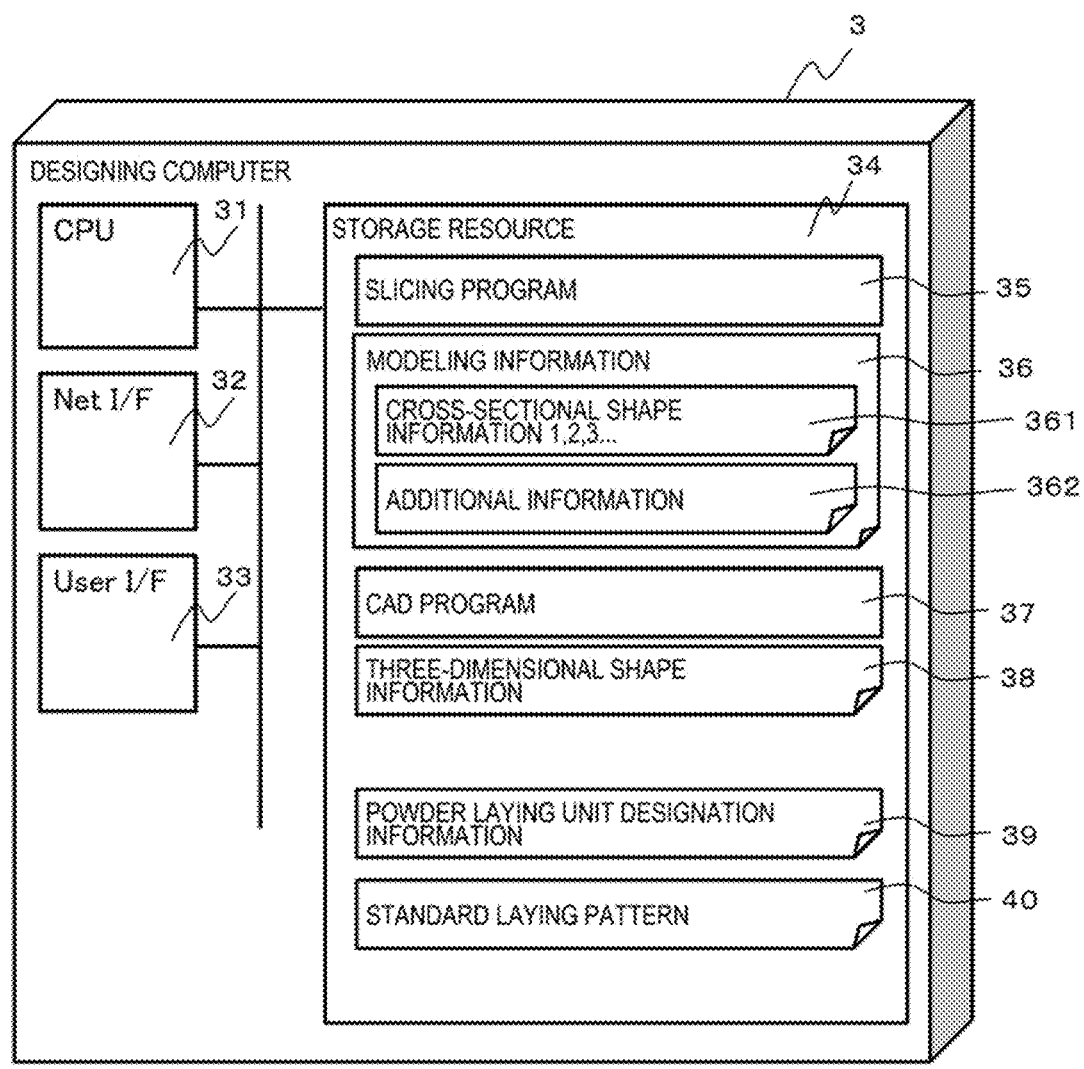
FIG. 10 is a configuration diagram of a calculation device for design according to one embodiment.

FIG. 10 is a configuration diagram of a calculation device for design according to one embodiment.

<<3.1. Hardware>>

The hardware configuration of the designing computer 3 is the same as the hardware configuration of the controller 22 except for the following configuration, and thus the detailed description of the same hardware configuration will be omitted.

The designing computer 3 includes a user interface 33.

The network interface 32 does not necessarily need to be able to communicate with the energy supply unit 23 or the modeling mechanism unit 21.

<<3.2. Information>>

A storage resource 34 stores the following information. The storage resource 34 may store information other than following information and part of the information may be omitted.

Three-dimensional shape information: The information includes the shape of a three-dimensional object to be molded. The three-dimensional shape information is typically generated by a CAD program, but may be modified by other programs as needed. The three-dimensional shape information is read by the slicing program, and is a source for generating modeling information. One example thereof is standard triangulated language (STL) format data.

Modeling information: Since the information has the same meaning as in the controller 22, the description will be omitted.

Standard laying pattern: Since the information has the same meaning as in the controller 22, the description will be omitted.

Powder laying unit designation information (an example of laying designation information): The powder laying unit designation information is information to be transmitted to the controller 22 and includes information to specify the powder laying unit to be used for each cross-sectional layer included in the modeling information. Format examples of the powder laying unit designation information are as follows:

including a pair of an ID given to cross-sectional shape information and an ID of a powder laying unit to be used for modeling the cross-sectional shape (which may be substituted with a direction such as an X direction or a Y direction);

including a list of IDs of cross-sectional shape information for an ID of a predetermined powder laying unit; and including one or more non-standard laying patterns (custom laying patterns) and a list of IDs of cross-sectional shape information to which the custom laying patterns are applied.

<<3.3. Program>>

The storage resource 34 stores the following programs. The storage resource 34 may store programs other than these programs, and some programs or processes may be omitted. The process performed by each program will be described later but the assignment of each program and the process is not limited thereto.

Management program of modeling apparatus 2: The program is a program for sending an instruction for managing the modeling apparatus 2. The instruction is, for example, selection of modeling start instruction, modeling stop instruction, and a laying pattern (including a standard laying pattern) and an input instruction. In addition, the program may display the state of the modeling apparatus 2. For example, information on whether or not modeling is in progress, laying pattern, and the above-mentioned invalidated powder laying unit or powder supply unit is an example. The information is considered to be acquired by making a request to the controller 22. In addition, as another example, it is considered that the information is stored in the designing computer 3 as management information by a user operation related to the information and this management information may be referred to.

Slicing program: Three-dimensional shape information is read and modeling information is generated. In addition, the generated modeling information and powder laying unit designation information are transmitted to the controller 22 via the network 4. Powder laying unit designation information may be included in the modeling information. The powder laying unit designation information may be transmitted by the following management program.

Simulation program: The program is a program that reads three-dimensional shape information and simulates thermal expansion and tensile strength under various conditions. The simulation result may be added as additional information (color data or the like) of the three-dimensional shape information. For example, the amount of deformation under a predetermined condition is converted into color data or the like and provided.

CAD program: A three-dimensional object to be molded by a user operation is designed and the design result is stored in three-dimensional shape information.

<<3.3.2. Operation of Slicing Program>>

The outline of a process for generating modeling information of a slicing program will be shown below as an example.

(Step 1) The slicing program specifies the reference plane from which the cross section is generated. The reference plane may be specified by the program based on the three-dimensional shape information, and after the designation of a user is received, reference plane may be specified based on the instruction. The designation of the reference plane including the movement direction of each powder laying unit may be received from a user.

(Step 2) In the slicing program, a plurality of surfaces parallel to the reference plane are defined as cut surfaces. Typically, the cut surface is a surface obtained by moving the reference plane from the reference plane to a direction normal to the reference plane by a predetermined pitch.

(Loop B start) The slicing program performs Steps B1 and B2 for each (referred to as a cutting end surface (Loop B)) of a plurality of cut surfaces until (Loop B end). The process may be performed collectively on the plurality of cut surfaces (Loop B).

(Step B1) The slicing program performs specifies information of the shape of the cross-sectional layer (referred to as cross-sectional shape information (Loop B)) on the cur surface (Loop B) of the three-dimensional object determined by the three-dimensional shape information.

(Step B2) The slicing program stores the cross-sectional shape information (Loop B) in the modeling information.

(Loop B End)

The above is the outline. The slicing program may generate the powder laying unit designation information described in the controller 22. For the generation process thereof, as long as the following is applied to the cross-sectional shape information (Loop B) as the additional process of Step B1, the powder laying unit used in the cross-sectional layer indicated by the cross-sectional shape information can be specified.

The ID of the powder laying unit applied to the cross-sectional layer of the cross-sectional shape information (Loop B) is received from a user.

The same process as "powder layer laying information generation process (standard laying pattern)" or "powder layer laying information generation process (generation based on the aspect ratio of the cross section shape)" described in the controller 22.

Specification of the powder laying unit based on the additional information (color, surface roughness or the like) of the three-dimensional shape data. In the description of color as an example, in a case where the cross-sectional shape is entirely (or by a predetermined threshold) surrounded by the yellow area (or the contour of the cross-sectional shape), the powder laying unit that moves in a first direction is specified and in a case where the surrounded area is less than a predetermined rate (for example, less than 20%), the standard laying pattern is applied. The user of the CAD program can designate the laying direction of the powder layer.

<<4. Others>>

The number of powder laying units of the modeling mechanism unit 21 may be two or more. In addition, the movement direction of the powder laying unit may not be orthogonal to the movement direction of another powder laying unit from the top viewpoint (on the upper surface of the material powder layer).

Various programs stored in the storage resource of the controller 22 and the designing computer 3 may be distributed on a computer for distribution (for example, a Web server). The server for distribution includes the same hardware configuration as the hardware configuration of the designing computer (however, the user interface is not necessary), and a program to be distributed is transmitted to the storage resource and a program to be distributed is transmitted to the network 4 in response to a distribution request received from the network. In addition, various programs may be stored in a nonvolatile memory and distributed.

REFERENCE SIGNS LIST

1: modeling system
2: powder layered modeling apparatus
3: designing computer
4: network
21: modeling mechanism unit
22: controller
211A, 211B, 211C, 211D: powder supply unit
212: modeling unit
2123: modeling space
213A, 213B: powder laying unit

The invention claimed is:

1. A powder layered modeling apparatus capable of modeling a three-dimensional object using a material powder containing at least a crystalline resin and filler particles,
   wherein the filler particles have a shape having a longitudinal direction, the powder layered modeling apparatus includes
a modeling unit which partitions a modeling space for laying a material powder layer by the material powder to mold the three-dimensional object,
a first powder supply unit which is capable of accumulating the material powder and moving the material powder to an upper part,
a first powder laying unit which is capable of laying the material powder layer in the modeling space by moving the material powder moved to the upper part of the first powder supply unit on a plane including a surface which becomes an upper surface of the material powder layer along a first axis with respect to the modeling space,
a first powder collecting unit,
a second powder supply unit which accumulates the material powder and moves the material powder to an upper part,
a second powder laying unit which is capable of laying the material powder layer in the modeling space by moving the material powder on the plane along a second axis not parallel to the first axis with respect to the modeling space,
a second powder collecting unit,
an energy supply unit which supplies energy for melting or sintering the material powder to a part constituting a cross-sectional layer to be molded of the three-dimensional object of the material powder layer laid in the modeling space,
wherein the first powder laying unit moves the material powder along a first direction of the first axis and a second direction of the first axis,
wherein the second powder laying unit moves the material powder along a first direction of the second axis and a second direction of the second axis,
wherein the material powder is layered in a pattern and the pattern is the first direction of the first axis, the first direction of the second axis, the second direction of the first axis and the second direction of the second axis,
wherein the first powder collecting unit, the first powder supply unit, a third powder supply unit, and a third powder collecting unit are arranged along the first axis, and
wherein the second powder collecting unit, the second powder supply unit, a fourth powder supply unit, and a fourth powder collecting unit are arranged along the second axis.

2. The powder layered modeling apparatus according to claim 1,
wherein in a case where the first powder laying unit and the second powder laying unit are deviated from an energy supply range by the energy supply unit, the energy supply unit supplies the energy to the material powder layer.

3. The powder layered modeling apparatus according to claim 1, further comprising:
a controller,
wherein the controller
(1) acquires cross-sectional shape information indicating each shape of a plurality of cross-sectional layers obtained by cutting the three-dimensional object by a plane parallel to a predetermined plane,
(2) acquires laying designation information that makes it possible to specify the first powder laying unit or the second powder laying unit to be used for laying the material powder layer when the cross-sectional layer is molded for at least one cross-sectional layer among the plurality of cross-sectional layers, and
(3) controls the first powder laying unit or the second powder laying unit to be specified by the laying designation information to lay the material powder layer, when a cross-sectional layer associated, according to the laying designation information, with the first powder laying unit or the second powder laying unit is molded.

4. The powder layered modeling apparatus according to claim 3,
wherein the laying designation information includes information to specify one or more cross-sectional layers for laying the material powder layer by the first powder laying unit among the plurality of cross-sectional layers.

5. The powder layered modeling apparatus according to claim 3,
wherein the laying designation information includes information to specify one or more cross-sectional layers for laying the material powder layer by the second powder laying unit among the plurality of cross-sectional layers.

6. The powder layered modeling apparatus according to claim 3,
wherein the laying designation information includes laying pattern information to define an order of the first powder laying unit and the second powder laying unit to be used for laying the material powder layer when the plurality of cross-sectional layers are molded, and
in a case where the first powder laying unit or the second powder laying unit to be used is associated with the cross-sectional layer, the controller controls the associated first powder laying unit or second powder laying unit to lay the material powder layer, and in a case where the first powder laying unit or the second powder laying unit is not associated with the cross-sectional layer, the controller controls the first powder laying unit or the second powder laying unit to lay the material powder layer based on the laying pattern information.

7. The powder layered modeling apparatus according to claim 1, further comprising:
a controller,
wherein the controller
receives filler nonuse designation for performing modeling using another material powder not containing the filler particles, and
controls, in a case where the filler nonuse designation is received, only one of the first powder laying unit or the second powder laying unit to lay the material powder layer.

8. The powder layered modeling apparatus according to claim 1, further comprising:
a controller,
wherein the controller
(A) calculates an aspect ratio of the cross-sectional layer for at least one of the cross-sectional layers of the three-dimensional object,
(B) determines which of the first powder laying unit or the second powder laying unit is used to lay the material powder layer when the cross-sectional layer is molded based on the calculated aspect ratio, and
(C) controls the determined first powder laying unit or second powder laying unit to lay the material powder layer when the cross-sectional layer is molded.

9. The powder layered modeling apparatus according to claim 1, wherein the first powder collecting unit, the first powder supply unit, a fifth powder collecting unit which is capable of opening and closing, a seventh powder collecting unit which is capable of opening and closing, the third powder supply unit, and the third powder collecting unit are arranged along the first axis, and the second powder collecting unit, the second powder supply unit, a sixth powder collecting unit which is capable of opening and closing, an eighth powder collecting unit which is capable of opening and closing, the fourth powder supply unit, and the fourth powder collecting unit are arranged along the second axis.

10. The powder layered modeling apparatus according to claim 9, further comprising:

a controller, wherein the controller closes the fifth powder collecting unit when the first powder laying unit moves the material powder, and wherein the controller opens the sixth powder collecting unit, the seventh powder collecting unit, and the eighth powder collecting unit when the first powder laying unit moves the material powder.

\* \* \* \* \*